(No Model.) 2 Sheets—Sheet 2.
C. E. EMERY.
METHOD OF AND MEANS FOR SPEED REGULATION OF ELECTRIC LOCOMOTIVES.
No. 517,948. Patented Apr. 10, 1894.
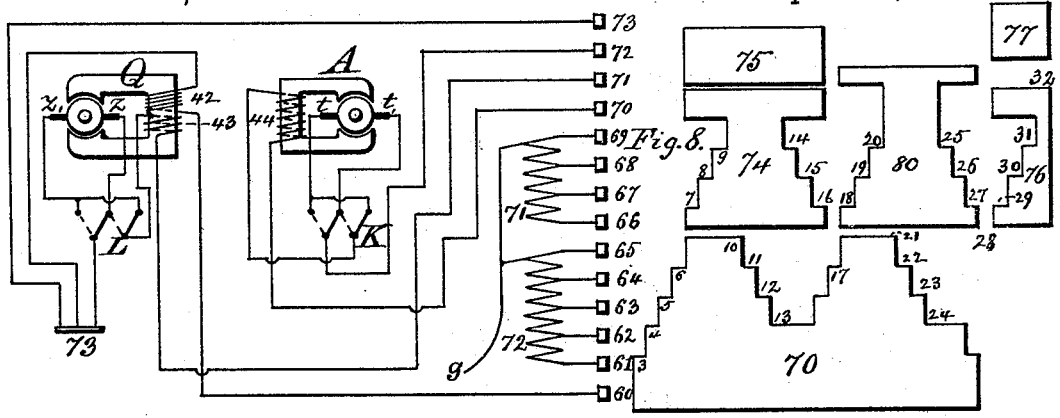
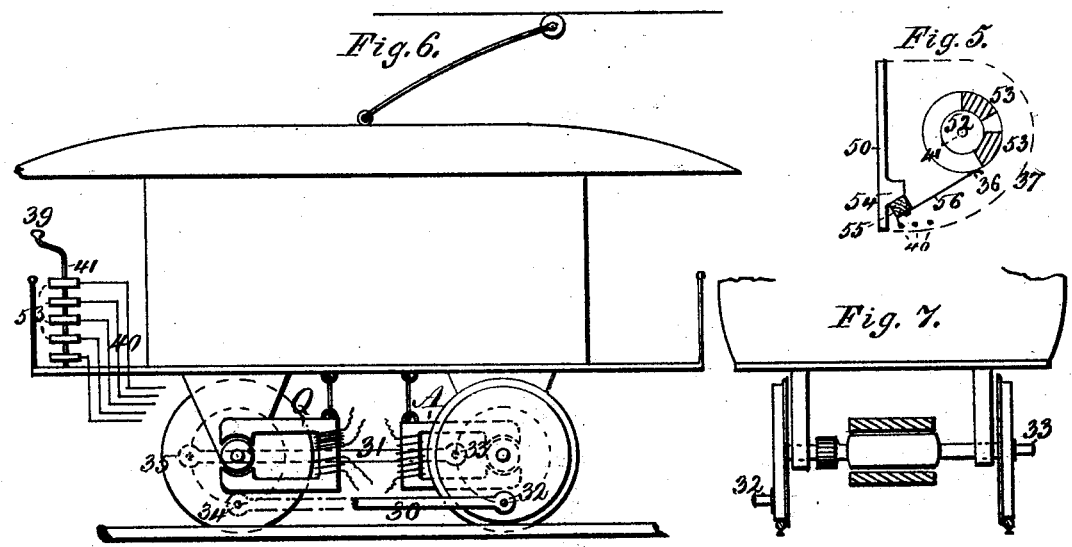
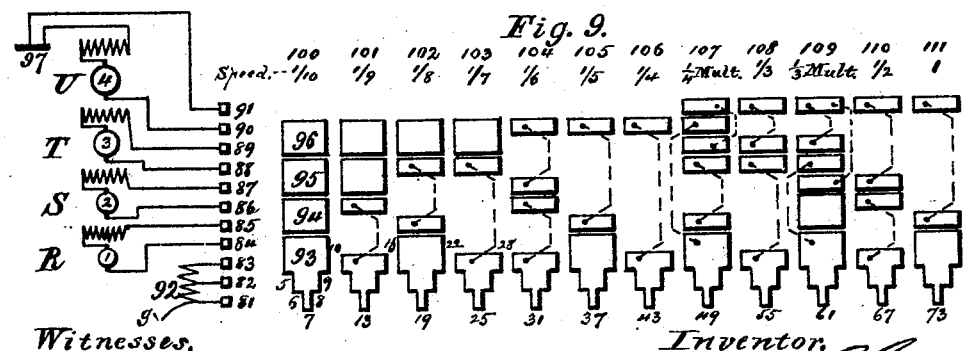
Witnesses,
Livingston Emery
Chas. B. Custer.
Inventor,
Chas. E. Emery

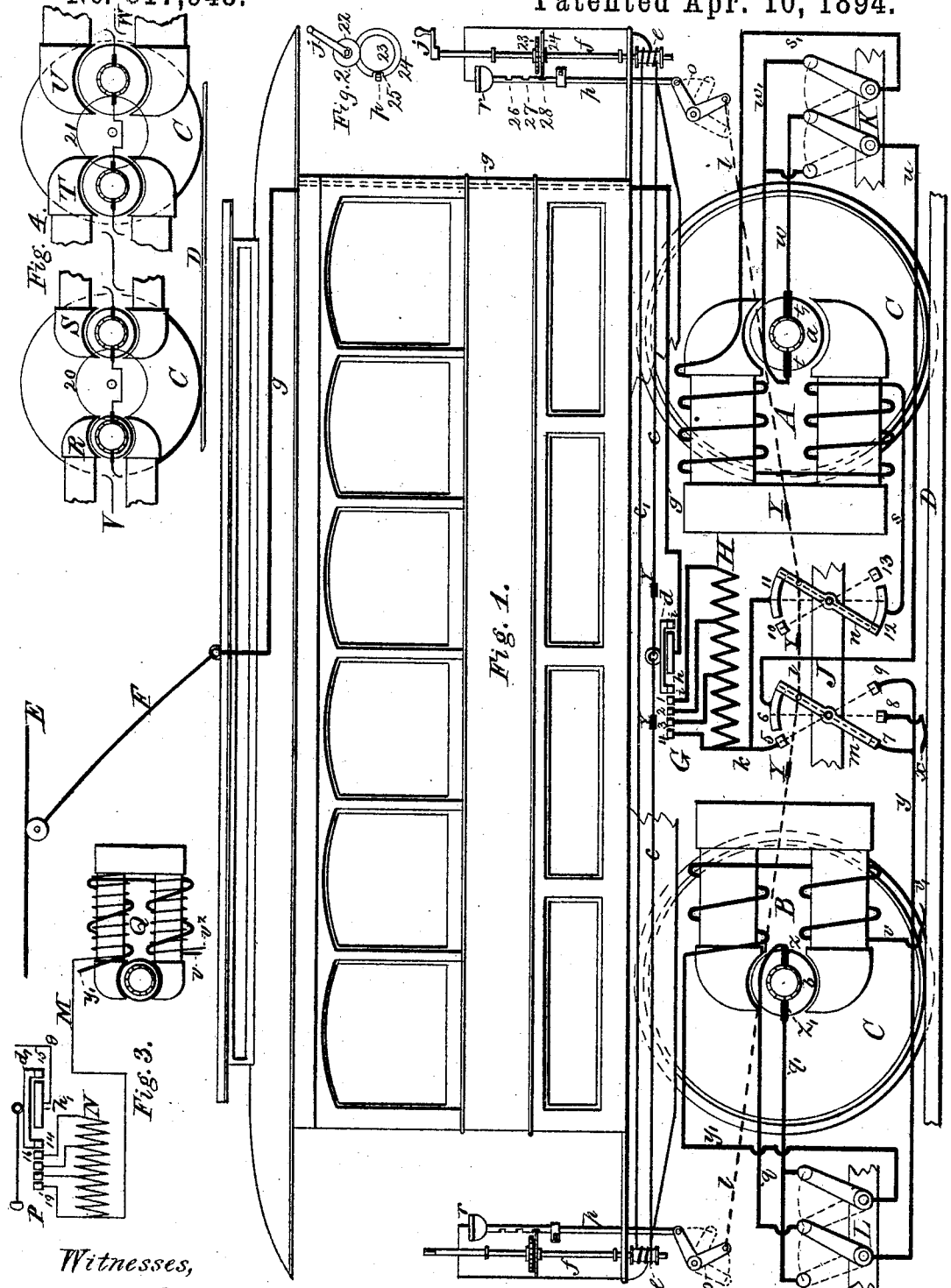

UNITED STATES PATENT OFFICE.

CHARLES E. EMERY, OF BROOKLYN, NEW YORK.

METHOD OF AND MEANS FOR SPEED REGULATION OF ELECTRIC LOCOMOTIVES.

SPECIFICATION forming part of Letters Patent No. 517,948, dated April 10, 1894.

Application filed October 14, 1892. Serial No. 448,809. (No model.)

*To all whom it may concern:*

Be it known that I, CHARLES E. EMERY, of Brooklyn, Kings county, New York, have invented a certain new and useful Method of Regulating the Speed of Cars and other Apparatus Operated by Electric Motors; and I do hereby declare that the following is a full, clear, and exact description of the same, reference being had to the accompanying drawings, making part of this specification.

It is well known that an electric motor when supplied with current will, if the load is not too great, increase its speed until the counter electro motive force developed equals the electro motive force or voltage available from the source of electric supply, or to the voltage at the terminals of the generator, less that lost in transmission to the terminals of the motor and in overcoming the electrical resistance of the motor itself. The portion of the generator voltage available to produce speed when all losses are considered will be called the available generator voltage. It follows from the above statement that motors which are so wound or proportioned as to severally run at different speeds when developing a counter electro-motive force substantially equal to the available generator voltage will develop different counter electro-motive forces when run at the same speed. If, therefore, motors, developing different counter electro-motive forces at the same speed, be operated in series, they will jointly develop a counter electro-motive force equal to the available generator voltage, and evidently such voltage must be distributed between the several motors in inverse proportion to the counter electro-motive forces developed severally by the same at the same speed. For the purposes of this specification motors which develop different counter electro-motive forces for a given speed of the car or apparatus to which they are attached are distinguished as motors which develop different counter electro-motive forces. Motors which, compared with others, develop the least counter electro-motive force at a given speed of car are in a comparative sense "fast" motors because they must run at higher speed than other motors to develop a given counter electro-motive force or that due to the available voltage, and on the other hand motors which develop a greater counter electro-motive force at a given speed than other motors are in a comparative sense slow motors, as the former will run at a slower speed than the latter to develop the same counter electro-motive force or that due to the available generator voltage.

The invention consists substantially in the method of regulating the speed of an electrically operated car or apparatus, which consists in providing for the operation of such car or apparatus a number of electric motors which will develop different counter electro-motive forces at like speeds of the car or apparatus to which they are attached, and so connecting and operating such motors in series or singly that the several arrangements of motors will operate such car or apparatus at different speeds for the same counter electro-motive force, or that corresponding to the voltage available, even when the same current is used in all cases.

The invention further consists in various combinations and details employed to carry into effect the general features above set forth.

In the drawings Figure 1 represents a side elevation of an electric car with the wheels toward the observer removed, and a pair of electric motors and their connections arranged diagrammatically under the car in such manner as to show the method of operation above described. Fig. 2 is a plan view of the regulator handle and gear. Fig. 3 is a diagrammatic elevation of a shunt motor and regulating rheostat to be substituted in place of one of the motors shown in Fig. 1. Fig. 4 is a diagrammatic view showing four electric motors connected to two car axles from which the wheels toward the observer have been removed. Fig. 5 represents a typical cross-section of a drum current regulator. Fig. 6 is a diagrammatic side elevation of a street car with axles connected by side rods, the wheel facing the observer on the left-hand axle being removed. Fig. 7 is a diagrammatic fragmentary cross-section through the center of the car shown in Fig. 3, with field magnets in cross section. Fig. 8 is a diagrammatic wiring plan for one series and one compound wound motor with development of segments required on drum regulator. Fig. 9 is a diagrammatic wiring plan for four motors arranged to accomplish the same purpose as those shown in Fig. 4, with development of segments required on drum regulator to operate the several motors in different combinations to drive the car at different speeds.

It has heretofore been proposed to operate the two dynamos on the axles of a street car "in series" when starting the car and at slow speeds, and "in multiple" when operating the same at speed. The operation in series saves current so long as the speed attainable is sufficient. When, however, the joint counter electro-motive force of the two motors approximates the electro-motive force of the current employed, the speed ceases to rise and it is necessary to operate the motors in multiple, thus making the entire voltage available for each motor and substantially doubling the speed under the same conditions, though intermediate speeds have been secured by changes in the strength of the field. For best efficiency with this arrangement the motors must each run at about the same speed as ordinary street car motors not provided with the series arrangement and the series system is employed to save current in starting and when car is necessarily run slowly when following slow moving vehicles. In order to operate the two motors in parallel satisfactorily at reasonable speed, they must both develop substantially the same counter electro-motive force for the same speed and current, for otherwise the current would seek the easier route, viz., through the motor developing the least counter electro-motive force, and be liable to injure the same, and even when the difference in counter electro-motive force developed is small the motor of slower speed may act as a generator, thereby holding back the car and increasing the load on the other motor. In my invention I purposely construct the two motors so that they will give different counter electro-motive forces at the same car speed and operate the said motors in series at starting, and for moderate speeds, the same as in the series multiple system above mentioned. In such case the two motors being connected mechanically by resting upon the same lines of rails must make the same speed if alike or must have a prearranged relative speed if car wheels or gears vary, and will on account of the different counter electro-motive forces develop different proportions of the electro-motive force of the current, thereby developing different powers, which makes no difference so long as the traction is sufficient to prevent slipping, as the aggregate power is all utilized in propelling the car. As soon as the speed has risen as high as it will under these conditions, or nearly so, the motor which develops the least counter electro-motive force is cut out by appropriate switches and the whole voltage made available to produce speed with the other motor, and when a speed greater than that which will be given with the motor with the greater counter electro-motive force is required that motor is cut out and current furnished the motor which developed less counter electro-motive force, when the speed is thereby again increased. The motors are preferably wound so that each will stand the whole or nearly the whole current usually employed for two motors in multiple, in which case the two motors in series will give the same or nearly the same tractive force at slow speeds as is ordinarily obtained with two in parallel and extreme flow of current prevented with a rheostat. In such case with the motors in series a little more than half the tractive force will be furnished by one motor and a little less than half by the other. If under these conditions one of the motors be cut out gradually through resistance, the motor remaining in use will, if the same current flows, continue to exert practically the same tractive force as before, but will run at a much higher speed, because the whole instead of part of the available generator voltage is employed. If the motor which develops the higher counter-electro-motive force be used it will run at less than double the speed of the two in series, whereas if the one with the least counter electro-motive force be operated it will run at more than double the speed of the two in series. The increased speed with the same current and the increased generator voltage available increases the power developed, but so long as the current is not increased beyond the point where the adhesion for one motor is sufficient when operated in series with the other motor, such motor will also carry the load when operated singly, the traction exerted being practically proportional to the current which as well as the field is supposed to remain constant and not to the available voltage which simply increases the speed possible with a "series-parallel" system. With the latter, as stated, the two motors must run at the same speed with the same current, and the speeds when the motors are in series and in parallel must be about as one to two, the resistances making a slight modification. With the series-single system, however, provided in this invention, one motor may develop more than one-half the joint counter electro-motive force of the two and the other less, so that the first operated singly will not quite double the speed and the second somewhat more than double it. For instance, the speed with the series-single system may be about as one in series to 1.8 and 2.5 for the motors operated singly, even when using the same current in all cases, whereas with motors of like counter electro-motive force operated in series, the speed must vary about as one to two in all cases other conditions remaining the same. There are, therefore, three general variations of speed available for the single system and only two for the series parallel system. Of course if commuted field coils be used to change the speed in one case they may also be used in the other and the proportional number of changes available with the two systems remain the same. With both systems also there will be great varieties of changes in speed due to the changes of current as it is automatically cut down by the variation in speed of the car. On the same principle any desired number of motors, each developing different counter electro-motive forces for the same speed, may be mechanically connected to operate the same car or other apparatus, and all or any number of the same used in series or each in turn used singly, thereby developing by a series of steps a large number of variations of speed. For instance, if three of the electric motors R, S and T, shown diagrammatically in Fig. 4, develop counter electro-motive forces with the same speed of car proportioned respectively as one, two and three the generator voltage available will be distributed between the motors, when in series, substantially in inverse proportion to the separate counter electro-motive forces. Since the sum of the assumed counter electro-motive forces is six, with all in series the motor R of faster speed will develop one-sixth of the whole available generator voltage, the motor S of next highest speed two-sixths or one-third of such voltage, and the third motor T three-sixths or one-half of such voltage. The motor R developing the least counter electro-motive force is the fastest, because it will need to run at a higher speed than either of the others to develop the available generator voltage. If the speed of this motor when operated singly be called unity, the speed with only motor S in use, having double the counter electro-motive force, will be relatively one-half that of motor S operated singly. The speed with only motor T in use, having three times the counter electro-motive force, will be relatively one-third that of motor S operated singly. The speed with motors R and T in series with joint counter electro-motive force four times that of motor R will be approximately one-fourth of that of motor R operated singly; with S and T in series the speed will be one-fifth, and with R, S and T in series the speed will be one-sixth of motor R operated singly, all based on the same available generator voltage. It should be understood that these speeds are only stated approximately for illustration. The variations in resistance due to a greater or less number of coils in series will change the relative and absolute speeds, but this simple method of calculation is sufficiently accurate for general description and illustration. As hereinafter shown, a number of motors of different counter electro-motive forces may also be grouped in series to form two or more groups of the same counter electro-motive force and such groups operated as desired in series or in parallel, and from the same elements other combinations may also be formed operated singly or in series.

In Fig. 1, A and B represent in general electric motors which will develop different counter electro-motive forces at like speeds of car. The armature of the motor A is designated $a$; that of the motor B is designated $b$. Each of these armatures is for simplicity of illustration shown attached to the axles of the car directly, though in practice there would be no objection to gearing or otherwise connecting either of the armature shafts to the car axle, or other apparatus to be driven, in any customary way.

C and C are wheels at the end of the axles opposite the observer.

D represents a rail upon which such wheels are resting, and in the illustration such rail forms one of the main electrical conductors, though a separate conductor may be provided as desired.

E represents a short portion of a trolley wire forming in the illustration one of the main electric conductors.

F is a diagrammatic representation of a trolley. The current from the main conductor E passes through the trolley F and the main conductor $g$ on the car, which is shown running along the roof, passing down through a corner post and brought back near the center of the car to the central plate $h$ of a current regulator, designated as a whole G, operating in connection with the rheostat H, shown in this case as a simple coil. The regulator G may be of any customary construction. The illustration is diagrammatic, a number of contact points, $i, i, 1, 2, 3, 4$, being provided, upon which slide the two depressed ends of a bridge-shaped connecting piece $d$, called a slider. The slider $d$ is to be of conducting metal, and in the position shown bears upon two insulated dummy points $i$ and $i$. The slider $d$ is shown provided with an eye to which are attached flexible connections $c, c$, leading each way to a drum $e$ on a vertical shaft $f$ at each end of the car. The return connection to the drums is designated $c''$. By taking a certain number of turns on each drum and fastening one of the central turns thereto, the slider $d$ may evidently be moved at will back and forth by turning either vertical shaft $f$ by means of a handle $j$ at the end of the car used as the front. By moving the slider to the left by means of handle $j$, one end of the slider $d$ comes in contact with the section $h$ of the regulator charged with current from the conductor $g$ and the other with the first point 1 connected to the right-hand end of the rheostat, so that current will flow through the slider $d$ and the whole rheostat H to a distributing conductor $k$, connecting with the commutator segments 5 and 11 of a change switch J yet to be explained. Evidently as the slider $d$ is moved farther and farther to the left over sections 2 and 3, it supplies current to shorter and shorter portions of the rheostat and finally on reaching point 4 the current flows directly to the intermediate conductor $k$.

J represents in general a compound change switch for connecting the two motors in series or cutting out either of the same while the other is in operation.

$m$ and $n$ are two conducting bars pivoted at the center and connected so as to be operated together by a rigid rod $l$ shown in dotted lines. This rod is also shown extended to the right and left and connected to bell cranks $o$, $o$, at the ends of the car, which are pivoted at the angle to suitable supports, not shown, and carry on their horizontal arms vertical rods $p$ provided with handles $r$ at their upper ends. Under limitations hereinafter to be expressed the change switch J may be operated by either of the handles $r$. The ends of the commutator bars $m$ and $n$ traverse commutating segments 5 to 13 inclusive, the office of which will be explained in connection with their operation. When the change switch J is in the position shown with the operating handle $r$ up, connections are made so that both motors will operate in series. When the operating handle $r$ is in mid position the commutator bars $m$ and $n$ of the change switch J will also be in mid position and the current pass only through the motor A. When the operating handle $r$ is down, the commutator bars $m$ and $n$ of the change switch J will be to the left at the top, the motor A cut out and the current supplied only to motor B. The course of the current may be traced for each of the several arrangements as follows: In the position shown the commutator bar $n$ bears at its upper end on the segment 11. When regulator G is in proper position the current passes from conductor $k$ through segment 11, commutator bar $n$, to the lower segment 12, thence along the conductor $s$, and through the field coils of motor A, thence through conductor $s'$ to one branch of a reversing switch, designated as a whole K, thence through the armature coils of motor A by the way of conductors $w$ and $w'$, brushes $t$ and $t'$ and a commutator, thence to the other branch of the reversing switch K, and from thence through the conductor $u$ to the upper segment 6 of the change switch J, thence through the commutator bar $m$ of such switch, to the commutator segment 7, thence through the conductor $y$ to one branch of a reversing switch designated as a whole L, thence through the armature coils of motor B by the way of conductors $q$ and $q'$, brushes $z$ and $z'$ and a commutator, returning to the other branch of the reversing switch L, then through conductor $y'$ and the field coils of motor B, and then via conductor $v$ to the ground via the metal work of the car, in any customary way, or as represented diagrammatically by a connection with the rail D through a brush $v'$. When the change switch J is moved centrally, it will be observed that the commutator bar $n$ at the right remains on the two segments 11 and 12, so that any current admitted through the regulator passes to the motor A as before. The left hand commutator bar $m$, as will be seen, remains at the top on the same commutator segment 6 as before, but at the bottom changes to a ground connection 8, which is connected as usual to the metal of the car or is provided with a brush connection $x$ to the rail as shown diagrammatically. In thus shifting commutator bar $m$ to the center, the supply of current to segment 7 and motor B is cut off. The circuit of motor A is completed to the ground and it alone operates. When one of the operating handles $n$ is pushed down, and the commutator bars $m$ and $n$ are shifted so that their tops are at the left, it will be seen that the connections of the commutator bar $n$ of change switch J are cut off from segments 11 and 12 and that such commutator bar $n$ rests upon insulated dummy segments 10 and 13. The commutator bar $m$, however, rests upon segment 5 and transmits current through its lower end to the segment 9 and conductor $y$, from which it passes to motor B in the same way previously described in relation to the series arrangement.

Y, Y, Y, Y, in the mechanical connections $c$ and $l$ to regulator G and change switch J, represent electric insulators, forming part of the length of such connections.

It will be observed that the commutator bar $n$ at the right of the change switch J merely operates to cut off the current from the regulator G to motor A during the third mode of operation, the circuit in this motor being already opened by the other commutator bar $m$. Evidently it may not under all conditions be necessary to open the circuit of motor A twice, in which case conductors $k$ and $s$ are to be connected by a simple conductor, such as $n$, not made movable.

It is understood that, as is customary in practice, the two commutator arms of the reversing switch K may by suitable connections be moved together to the positions shown in the dotted lines, when the current from the conductors $s'$ and $u$ will be reversed in direction through the brushes and armature, and that the same is also true of the reversing switch L and the conductors $y$ and $y'$ and that in practice the two reversing switches will be operated together and the mechanical connections thereto and the electrical connections to the commutator brushes and fields be so made that the two motors will operate in the same direction with a handle operating the reversing switches in one position and in the opposite direction when it is in another position. It is not, however, necessary that any of the connections be made exactly in the way shown. Any customary arrangement will answer which will insure the mode of operation set forth. So also, the connections to the change switch J may be modified in several ways and yet produce the same results as have been described, which is all that is desired, to wit, that the motors operate in series in one position of such change switch; that one motor operates alone in another position thereof, and that the other motor operates alone in still another position thereof. Evidently, also, the details of construction of the regulator and of the change switch may be modified in many ways so long as the current is directed to produce the results above set forth. In practice it will be understood that the regulator and the change and reversing switches will be placed in convenient positions where they will take much less room than shown in the drawings. It is to be understood also that all parts are to be supported in proper positions relative one to another, and that the various commutator and regulator segments and sections and all electric conductors are to be suitably supported and insulated. The fact that the electric motor A will develop a greater counter electro-motive force than motor B at the same speed of car is roughly shown in the diagram by making motor A larger than motor B and placing more turns on the field.

It is to be understood that the counter electro-motive force may be varied in any customary way. It will in general not be necessary to make the motors of different sizes. Preferably, however, the number of turns on the armature will be reduced for motor B with the least counter electro-motive force, and the number of turns on the field of that motor may or may not also be reduced; so, also, the number of turns on the armature may remain the same and the strength of the field of motor B be reduced. The same result may also be accomplished by making the magnets of motor B of smaller size or with less permeability, or by gearing its armature shaft to the car axle so that it will run relatively slower, or the car wheels operated by motor B may be larger than those operated by motor A.

While the three changes possible with the change switch J may, when parts are properly proportioned, be accomplished when the motor is running without changing the strength of the current, still, to prevent sparking at the commutating segments of such switch, it is preferred that the changes be made only when the current is cut off or greatly reduced by means of the rheostat G. This could be done by the judgment of the operator, but to guide such judgment a stop motion is provided.

In Fig. 2, 22 and 23 represent the pitch circles of two wheels gearing together, of which the former, 22, is attached to shaft $f$. To the latter is attached a disk, 24, with a notch, 25, at one side with which the rod $p$ of change switch J engages. Such rod $p$ is provided with three notches, 26, 27 and 28, corresponding to the three positions of change switch J, and either may be put in position opposite the edge of disk 24 when the notch 25 in same is opposite rod $p$. It is arranged that this shall take place only when the slider $d$ of the regulator G is in position to entirely or partially cut off the current, and the notch 25 may be made wide enough to permit the slider $d$ to be either on the contact points $i, i$, or $h$ and $l$, &c., if desired. As soon, however, as the handle $j$ is turned, it revolves the disk 24 and the edge of the same entering one of the notches 26, 27 or 28 in the shank $p$ of the operating handle $r$ of change switch J, locks such shank and prevents it from being operated until the current is again reduced by the reverse motion of the handle $j$. In operation the handle $r$ would on first starting be in the position shown, so that both motors are in series. Under these conditions the full current may be applied, but the handle $r$ cannot again be operated until such current is shut off to bring notch 25 in disk 24 in position, as previously explained, momentarily, when such handle may be placed in mid position or even in the extreme downward position if running rapidly down a grade and the current again applied. Ordinarily, however, the shift will be made quickly after nearly the full speed due to the series system has been attained, the current will then be quickly checked by the handle $j$ of the regulator, the handle $r$ shifted quickly to throw the change switch J to the middle position, so that motor A only will be operated, and then when that motor is running nearly to speed the current will again be cut off by operating handle $j$ and the change switch J again operated by handle $r$, so that only motor B will be operated. In stopping, of course, the current will first be shut off and the change switch thrown to the position shown, so as to be ready to start in series with all the motors.

Either or all of the motors shown in Figs. 1 and 4 may be of the shunt or compound wound type instead of the series type as previously described. The compound wound type represented as a whole by Q, Fig. 3, is preferred with sufficient series turns to partially magnetize the field when current first begins to flow, even though the current is not established promptly in the shunt coils on account of their resistance. The series turns are represented by the heavy black lines and the ends $y'$ and $v$ brought out in such position that if this motor were put in the place of the motor B such ends would connect with the conductors similarly lettered in Fig. 1. The shunt turns, Fig. 3, are represented by the finer lines on the poles of the magnet. It is intended that the terminal $v^2$ of this coil be connected to the earth through conductor $v$, Fig. 1, the same as the series turns, and that current be supplied to the end M of the shunt coils through a rheostat N represented as a simple coil and a regulator designated as a whole P. The construction of this regulator is diagrammatically shown exactly like regulator G in Fig. 1; so, evidently, if current be brought from the trolley connection through a conductor $g$ to the central section $h'$ of regulator P, it may by shifting the conducting slider $d'$ be sent through the whole or part of the rheostat N to the conductor M and through the shunt coils. Ordinarily the slider $d'$ would just before the motor is started be pulled to the extreme left, so that the shunt coils would be excited with the full current, no part of the same passing through the rheostat, then when the series coils received current through the main regulator the field of the motor Q would be fully energized at starting. With the motor Q, Fig. 3, in place of motor B, Fig. 1, the two motors A and Q will, as previously described, be in series for the first position of the change switch J. Under these circumstances with the shunt current at its maximum, as previously explained, the speed of the car may be increased by gradually moving the slider $d'$, Fig. 3, from left to right, thereby throwing resistance from the rheostat N into the shunt circuit and reducing the shunt field so that the motor will develop less counter electro-motive force than before, and a higher speed of the two motors and of the car be necessary to develop the electro-motive force or voltage of the line. The reduction of the intensity of the shunt field may be continued if desired until such field is entirely cut out and the magnets of the motor A only excited by the series field, taking care that the strength of the field is not so much reduced as to cause sparking. Under these circumstances if the change switch be thrown to mid position, the motor Q will then be cut out and only motor A operated, and the speed will again be increased until the counter electro-motive force of motor A approximately reaches that of the line. Before the next change is made the slider $d'$ of regulator P is to be pulled to the left so as to excite the shunt field coils of motor Q, when the shift valve J may be thrown to the extreme left (at the top) and the motor Q operated singly, when the speed will increase until sufficient counter electro-motive force is developed by motor Q to balance the available electro-motive force of the line, and on reducing the strength of the field, by moving the slider $d'$ to the right the speed may be still further increased even to the extent of entirely cutting out the shunt coils, if series coils are provided as shown, and depending upon the latter entirely for exciting the field. If motor A be also a shunt or compound wound motor, as shown in Fig. 3, and its field be at first of full strength, the speed may be increased by reducing the strength of the field whether such motor A be in series with the motor B, series wound, or motor Q, shunt or compound wound. So, also, when such motor A is running alone, its slowest speed under those circumstances will be when its field has the maximum strength and the speed may be increased by decreasing its field. It will thus be seen that whether one or both of the motors are shunt or compound wound a change in the strength of the field of either or both will reduce the counter electro-motive force of the system then in operation and increase the speed. The same result may also be produced by cutting out turns of the field with a regulator like G, Fig. 1. In fact, we may suppose that the rheostat represents field coils and the regulator G a special apparatus arranged to cut out a portion of such coils in the manner described in relation to the main current. The arrangement for changing the strength of the field may be combined with the current regulator by the use of the well known drum regulator shown in Figs. 5 and 8 hereinafter described.

Fig. 3 shows a compound wound motor with rheostat for regulating the shunt coils and with connections lettered so that such motor, designated as a whole Q, may be substituted in place of motor B in Fig. 1.

Fig. 6 shows diagrammatically, on a reduced scale, the construction in Fig. 1 with the substitution referred to made, many of the details being omitted to simplify the drawing. This view shows also both axles connected by the well known locomotive parallel rods. The axle bearings are to be arranged inside the wheels and the parallel rods 30 and 31 connect to crank pins 32, 34, 33 and 35 in the wheels, which pins are set at right angles on the opposite ends of the shafts and thereby insure that both pairs of wheels run at the same velocity and that power applied by one motor to either pair of wheels will be transmitted to the other pair so that the whole adhesion is available.

In the diagrammatic representations of the motors Q and A, Fig. 6, the field coils are shown wound on the vertical yokes of the field magnet so that they will show beyond the wheels and not confuse the drawing. The various electrical connections omitted from Fig. 6 are produced in the diagrammatic representation Fig. 8, in which Q represents the shunt motor and A the series motor as before, here disassociated from their respective axles, and the electric conductors are shown running to the points of a regulator designed to accomplish with a single back and forth angular movement the greater portion of the various operations previously described in relation to the separate regulators G and P on Figs. 1 and 3.

Fig. 5 represents a typical section of an ordinary drum regulator. No. 50 is the back plate which is in general vertical and secured to the platform rail of a car. To this back plate is secured a box with ends shaped somewhat like the contour 37, indicated by dotted lines. These ends support the vertical shaft 41 of a regulating cylinder, which is the customary method of construction provided with a non-conducting core 52, of wood for instance, upon which are secured metal conducting segments 53 of the desired shape to secure purposes hereinafter described. The back plate 50 is provided with a lug 54 to which through a non-conducting piece 55 are secured metallic springs or brushes 56, the outer ends of which, 36, are arranged to bear upon such of the metal segments 53, on the cylinder 52, as come opposite such brushes when the cylinder 52 is revolved. It should be understood that, as in common practice, there are a number of springs 56 arranged vertically and insulated from each other and that segments 53, on the drum 52, are arranged opposite such conducting springs. A series of brushes and segments is represented diagrammatically by short cylinders 53, 53, &c., on the platform of a car in Fig. 6, 39 being the operating handle and 40, 40, &c., electric conductors running from the same in manner shown in detail in Figs. 8 and 9. The several brushes 56, Fig. 5, are connected to electric conductors 40, of which a few only are shown in Figs. 5 and 6, which pass down inside of an external casing 37, Fig. 5, through the floor of the platform (see Fig. 6) and lead to the various connections shown diagrammatically in Figs. 8 and 9. In Fig. 8 the small squares 60 to 73 inclusive represent contact points, like 36, Fig. 5, of thirteen springs or brushes like 56 same figure, and the irregular figures at the right represent the development of the conducting segments 53 upon the surface of the cylinder 52. The segments could be shown by horizontal strips representing segments the width of a brush, but in the development all the strips which are electrically connected are united in an irregular figure. The diagram is readily understood if it be considered that the points 60 to 73 are stationary and that the several figures at the right are by angular motion of the vertical shaft 41, in Figs. 5 and 6, moved to the left in Fig. 8, so as to successively come in contact with such contact points 60 to 73. Such movement would naturally be made by a series of steps represented by the steps upon the irregular figures in Fig. 8 and numbered from left to right to correspond to the several positions of the regulator. The current from the generator is admitted at $g$ directly to contact points 65 and 69 and to the beginning of the rheostat coils 71 and 72. Points 68, 67 and 66 are successively connected to the rheostat coil at different distances from the beginning of such coil and similarly clips 64, 63, 62 and 61 also connect to rheostat coil 72 at different distances from the connection to $g$. As the regulator is moved to position 3 the current is first delivered through the whole resistance 72 and point 61 to segment 70 and through point 60 to the shunt coil 42 on motor Q, from which it passes to the ground 73. The progressive movement of the regulator from 3 to 6 gradually cuts out the resistance of coil 72. In position 7 point 65 puts plate 70, and through point 60 the shunt coil 42, in direct communication with the generator through $g$, the resistance in the shunt circuit being entirely removed. Through point 66 $g$ is also put in communication through the whole resistance 71 with regulator segment 74 and current flows through the upper branch thereof and point 70 around the magnet coil 44 of motor A to one of the points of reversing switch K, thence in position of switch shown through the armature *via* the brushes, thence again through reversing switch to regulator point 72, thence through regulator plate 75 to point 71, thence through the conductor shown and series coil 43 of motor Q to one point of reversing switch L, thence through the armature *via* the brushes; thence through the reversing switch to the ground at 73. In other words, the two motors Q and A are operated in series with the shunt field of motor Q fully charged. As the regulator is moved to points 8, 9 and 10 the resistance of coil 71 is gradually cut out of the main circuit and maximum power and speed for these conditions obtained. The further movement of the regulator to points 11, 12 and 13 simply cuts out points 65, 64 and 63, thus introducing resistance into the shunt field and increasing the speed of that motor. The diagram does not show the shunt field entirely cut out as referred to in relation to Fig. 3, but position 13 may represent the least reduction of the shunt field which it is desirable in a particular case to make. The regulator is then to be moved rapidly to position 18, the changes being that points 69, 68, 67 and 66 are in succession cut out as well as points 70 to 73 inclusive, thus cutting off the current entirely in the main circuit and meanwhile the resistance is gradually removed from the shunt circuit so that after passing the gap, position 17, which should be wide enough to prevent sparking as is customary, at position 18 the current is received by segment 80 from point 66 and delivered only to point 71, thereby operating only the motor Q. By the further motion of the regulator the resistance 71 is gradually cut out until position 21 is reached, when the maximum field for shunt motor Q is reached. The speed of the motor may be increased by moving the regulator to positions 22 to 24 which introduce resistance in the shunt field connections by cutting out points 65, 64 and 63 successively. The further movement of the regulator from positions 24 to 28 gradually introduces resistance 71 in the main circuit and finally cuts off the current from all the circuits at gap 28 which is made wide enough to prevent sparking. The further movement of the regulator only gives current through segment 76 and point 70 to motor A, the terminal of this motor being at this time through plate 77 and points 72 and 73 grounded so that motor A runs singly. The continued movement of the regulator gradually cuts out the resistance of coil 71 and in the final position, point 32, motor A is running with the maximum current. By moving the regulator in the opposite direction, evidently the several operations would be reversed and the main circuit finally broken at position 7 and the shunt circuit at position 3.

In Fig. 4, C, C, designate the farther wheels of a car, as in the previous case. To the axle of each of these wheels are geared the armature shafts of two motors making four motors in all, designated respectively R, S, T, U. The armatures and commutators are represented by circles, and fragments are shown of the field magnets. The armatures are geared to main axles through wheels having their pitch lines at the light line circles 20 and 21. The sizes of the armatures and fields are progressively increased from left to right to show roughly that the motors are to be of different counter electro-motive forces, though as before explained this need not in all cases be accomplished by changes in size. As shown, a conductor with terminals V and W connects to the brushes of all the motors, being broken by curved lines for each motor to show where connections can go out for exciting the fields, though such connections have not been put in place. Such details as the reversing switches, change switches and rheostats are omitted, the only object of this figure being to show diagrammatically that upon the same car there may be more than two motors, four, for instance, as shown, part or the whole of which may develop different counter electro-motive forces at like speed of car, all of which may be coupled up in series substantially as has been explained in relation to motors A and B, and that by suitable change switches any number of the same may be put in series or any one of the same operated singly, the connections for this purpose being merely modifications of those shown in relation to motors A and B, Fig. 1. Either or all of said motors may be shunt motors or compound wound motors or series wound motors, and some may be of one kind and some of another, as desired, the system of working in series or singly not requiring as in the series multiple plan that the motors be either of the same kind, of the same size or developing the same counter electro-motive force at the same speed.

Fig. 9 shows diagrammatically one way of making the several connections to operate the said motors with any desired combination of series groups and the practicable combinations in parallel groups when the counter electro-motive force developed by the motors R, S, T and U at the same speed are considered to be as one, two, three and four respectively. In this case the small squares 81 to 91 respectively represent contact points 36 of springs, like 56, Fig. 5, as before, and the irregular figures at the right, under headings showing general positions 100 to 111 inclusive, represent the development of regulator plates on the surface of the cylinder 52, Fig. 5. At the left, arranged vertically one above the other, are shown diagrammatic representations of the motors R, S, T and U, with relative counter electro-motive forces written centrally thereon. The armatures and fields are shown connected up in series, leaving two terminals for each motor. The contact points 81, 82 and 83 connect respectively different points of a resistance coil 92 to one end of which current from the generator is supplied through conductor g. The several contact points from 84 to 89 inclusive connect successively to the terminals of the motors R, S and T. 90 connects to one terminal of motor U and the other terminal of this motor connects to the ground, 97, which is also connected to point 91. It will be noted that as the regulator is moved to special position 5 under general position 100 shown by the heading, current through the resistance 92 is delivered to segment 93 and by it through point 84 to one terminal of motor R, that the other terminal of motor R, is through points 85, 86 and segment 94 connected with one terminal of motor S; that the other terminal of motor S and one terminal of motor T are connected through points 87 and 88 and segment 95, and that the other terminal of motor T and the first terminal of motor U are through points 89 and 90 and segment 96 connected so that the current flows in series through resistance coil 92 and all the motors to the ground at 97. The further movement of the regulator gradually cuts out the resistance 92, so that at special position 7, general position 100 as before, the full current is flowing in series through all the motors. Evidently by further movement of the regulator the resistance in regulating coil 92 is cut in and the circuit finally broken at special position 10 on all of the contact points previously in use. The gap 10 is to be made wide enough to break the spark, though here for convenience shown only one division in breadth, and this statement applies to all the gaps between the several arrangements of segments shown on the diagram. On principles above expressed the tractive force exerted by all the motors in series is proportioned to the sum of the counter electro-motive forces one, two, three, four or ten, and the speed is, subject to exceptions previously noted, one-tenth that of the faster motor R for the same available generator voltage. It will be seen by inspection that the arrangement for putting on and cutting off the current through resistance is the same for each of the various systems of operation shown by arrangement of segments at the right and need not be further described. The dotted lines represent electric conductors connecting electrically various segments.

In the second method of coupling shown, general position 101, it will be seen that both terminals of motor R are cut out and that the current passes in series through motors S, T and U. The sum of the counter electro-motive forces being nine the pulling power is substantially nine times that of motor R and the speed approximately one-ninth of the same. Similarly it will be seen that in general position 102, motor S is cut out, motors R, T and U in series, giving substantially one-eighth the maximum speed. In general position 103 only motors T and U are in series, giving substantially one-seventh the maximum speed. In general position 104 only motors S and U are in series, giving substantially one-sixth the maximum speed. In general position 105 only motors R and U are in series, giving substantially one-fifth the maximum speed. In general position 106 only motor U is employed, giving substantially one-fourth the maximum speed. In general position 107, however, motors R and T are in series and the series combination in parallel with motor U. The sum of the counter electro-motive forces by both routes is four, so the tractive force is substantially four times that of motor R and the speed approximately one-fourth of that of that motor with the same available generator voltage. There are, however, two routes for the current reducing the resistance and enabling a stronger current to be used and more power developed. In general position 108 only motor T is employed, giving substantially one-third the maximum speed. In general position 109 motor T is connected in parallel with motors R and S in series, the counter electro-motive forces of each of the two systems being substantially three, so that the same remarks apply as in relation to general position 107. In general position 110 only motor S is employed, giving substantially one-half the speed of motor R, and in general position 111 only motor R is employed, giving the maximum speed hereinbefore referred to.

What I claim as my invention, and desire to secure by Letters Patent, is—

1. The method of regulating the speed of an electrically operated car or apparatus, which consists in electrically connecting a generator, at will, with motors, singly or in series, which motors severally develop different counter electro-motive forces at like speeds of the car or apparatus to which they are attached, thereby operating such car or apparatus at different speeds for the same available voltage.

2. The method of regulating the speed of an electrically operated car or apparatus, which consists in electrically connecting a generator with motors, which are severally of unlike counter electro-motive force when operated in multiple at like speeds of the car or apparatus to which they are attached, at will singly, in series or in series groups of like counter electro-motive force, whereby several of the arrangements will operate such car or apparatus at different speeds for the voltage available.

3. In combination with the axles of a car, a number of motors of different counter electro-motive forces and switching apparatus for at will operating such motors singly or in parallel groups formed by connecting units with unlike counter electro-motive forces in series to form a group in parallel with a similar group or unit having substantially the same total counter electro-motive force, substantially as and for the purposes specified.

4. The combination with an axle of a car and a motor for operating the same provided with shunt windings, of a rheostat and regulator for regulating the current supplied to the armature of such motor, a rheostat and regulator for regulating the current supplied to the shunt field coils of such motor, and apparatus for operating such regulators brought to the working platform of the car, substantially as and for the purposes specified.

5. The combination with electric supply conductors and the axles of a car, of a series wound motor, a motor provided with shunt field coils, a change switch to cause such motors to operate singly or in series, a rheostat and regulator for regulating the main current supplied to the motors in operation, a rheostat and regulator for regulating the current supplied to the shunt coils and apparatus for operating such regulators brought to the working platform of the car, substantially as and for the purposes specified.

6. In combination with electric supply conductors and the axles of a car and a number of electric motors for operating the same, each developing different counter electro-motive forces at like speeds of car, a change switch for connecting such motors in series to the line and for cutting out each or a number of the same at will and a handle for operating the said change switch from a working platform, substantially as and for the purposes specified.

7. In combination with a change switch to connect several motors to operate singly or in series and in combination with a regulator and rheostat for regulating the current and with handles for operating the said switch and the said regulator from a working platform, an apparatus for locking the change switch by the motion of the current regulator and unlocking such switch when such regulator is in the desired position, substantially as and for the purposes specified.

CHAS. E. EMERY.

Witnesses:
GEO. H. CASAMAJOR,
S. L. EMERY.